United States Patent
Wang et al.

(10) Patent No.: US 12,099,628 B2
(45) Date of Patent: Sep. 24, 2024

(54) PRIVACY PROTECTION IN A SEARCH PROCESS

(71) Applicant: INTERNATIONAL BUSINESS MACHINES CORPORATION, Armonk, NY (US)

(72) Inventors: Jin Wang, Xi'an (CN); Lei Gao, Xian (CN); A Peng Zhang, Xian (CN); Kai Li, Xian (CN); Jun Wang, Xi'an (CN); Xiao Ming Ma, Xi'an (CN); Xin Feng Zhu, Xi'an (CN); Geng Wu Yang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/661,780

(22) Filed: May 3, 2022

(65) Prior Publication Data
US 2023/0359758 A1 Nov. 9, 2023

(51) Int. Cl.
*G06F 18/23* (2023.01)
*G06F 16/35* (2019.01)
*G06F 21/62* (2013.01)

(52) U.S. Cl.
CPC .......... *G06F 21/6245* (2013.01); *G06F 16/35* (2019.01); *G06F 18/23* (2023.01)

(58) Field of Classification Search
CPC .................................................... G06F 16/35
See application file for complete search history.

(56) References Cited

U.S. PATENT DOCUMENTS 11,023,675 B1 * 6/2021 Neervannan .......... G06F 16/338
11,507,609 B1 * 11/2022 Warmsley ............. G06F 16/335
(Continued)

FOREIGN PATENT DOCUMENTS

CN 107292189 B 12/2018

OTHER PUBLICATIONS

Kodeswaran, et al., "Applying differential privacy to search queries in a policy based interactive framework." Published Nov. 6, 09. 8 pages. In PAVLAD '09: Proceedings of the ACM first international workshop on Privacy and anonymity for very large databases. pp. 25-32. https://doi.org/10.1145/1651449.1651455.

(Continued)

*Primary Examiner* — Dangelino N Gortayo
(74) *Attorney, Agent, or Firm* — Matthew Zehrer

(57) ABSTRACT

The present disclosure relates to privacy protection in a search process. According to a method, a target emotion vector is extracted from a search interaction, the target emotion vector representing emotional information in the search interaction. Respective emotion distances between the target emotion vector and respective emotion vectors associated with a plurality of text clusters are determined. The plurality of text clusters is clustered from a dictionary of text elements. A first number of text clusters are selected from the plurality of text clusters based on the determined respective emotion distances. The first number of text clusters have emotion distances larger than at least one unselected text cluster among the plurality of text clusters. A plurality of confused search interactions are constructed for the search interaction based on the first number of text clusters, and the plurality of confused search interactions are performed.

20 Claims, 5 Drawing Sheets

(56) References Cited

U.S. PATENT DOCUMENTS

| | | | |
|---|---|---|---|
| 11,599,732 B2* | 3/2023 | Morris | G06F 40/30 |
| 2013/0054554 A1 | 2/2013 | Cao | |
| 2014/0026221 A1 | 1/2014 | Reza | |
| 2017/0220677 A1* | 8/2017 | Kazi | H04L 67/53 |
| 2017/0270316 A1 | 9/2017 | Ho | |
| 2021/0248247 A1* | 8/2021 | Poothokaran | G06N 3/044 |
| 2022/0198061 A1* | 6/2022 | Moriarty | G06F 16/2379 |
| 2022/0384038 A1* | 12/2022 | Martin | G06F 16/35 |
| 2022/0414492 A1* | 12/2022 | Jezewski | G06N 5/04 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Yu, et al., "Hide-n-Seek: An Intent-aware Privacy Protection Plugin for Personalized Web Search." Published Jun. 27, 2018. 4 pages. In SIGIR '18: The 41st International ACM SIGIR Conference on Research & Development in Information Retrieval. pp. 1333-1336. https://doi.org/10.1145/3209978.3210180.

* cited by examiner

PRIVACY PROTECTION IN A SEARCH PROCESS

BACKGROUND

The present disclosure generally relates to computer techniques and, more particularly, to a method, system, and computer program product for privacy protection in a search process.

Online services, such as web searching service, are becoming more and more popular. The services may collect information the users provided and recommend personalized information or services to the users. The more and the longer the service knows about an individual, the better personalization it can provide.

Typically, the web searching service builds user profiles on servers (e.g., containing frequently visited websites, user interests, demographic information, location, etc.) by tracking multiple search interactions of the same user and linking them together. However, sometimes the individuals may want their activities to remain private, for example, to avoid unwanted advertisements or to hide private exploring actions. Therefore, it may be desired to provide a privacy-preserving search process.

SUMMARY

According to an aspect of the present disclosure, there is provided a computer-implemented method. The method includes extracting a target emotion vector from a search interaction. The target emotion vector represents emotional information in the search interaction. The method further includes determining respective emotion distances between the target emotion vector and respective emotion vectors that are associated with a plurality of text clusters. The plurality of text clusters are clustered text elements from a dictionary of text elements. The method further includes selecting a first number of text clusters from the plurality of text clusters based on the determined respective emotion distances. The first number of text clusters have emotion distances larger than at least one unselected text cluster among the plurality of text clusters. The method further includes constructing a plurality of confused search interactions for the search interaction based on the first number of text clusters and the plurality of confused search interactions.

Through this solution, by constructing and performing confused search interactions with different emotions from the actual search interactions, it is possible to confuse the algorithm which collects search interactions from user devices and thus hidden actual user attitudes and preferences. In this way, the search privacy may be preserved.

According to another aspect of the present disclosure, there is provided a system. The system includes a processing unit and a memory coupled to the processing unit and that stores instructions thereon. The instructions, when executed by the processing unit, perform operations of the method according to the first aspect of the present disclosure.

According to yet another aspect of the present disclosure, there is provided a computer program product being stored on a machine-readable storage medium and comprising machine-executable instructions. The instructions, when executed on a device, cause the device to perform operations of the method according to the first aspect of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
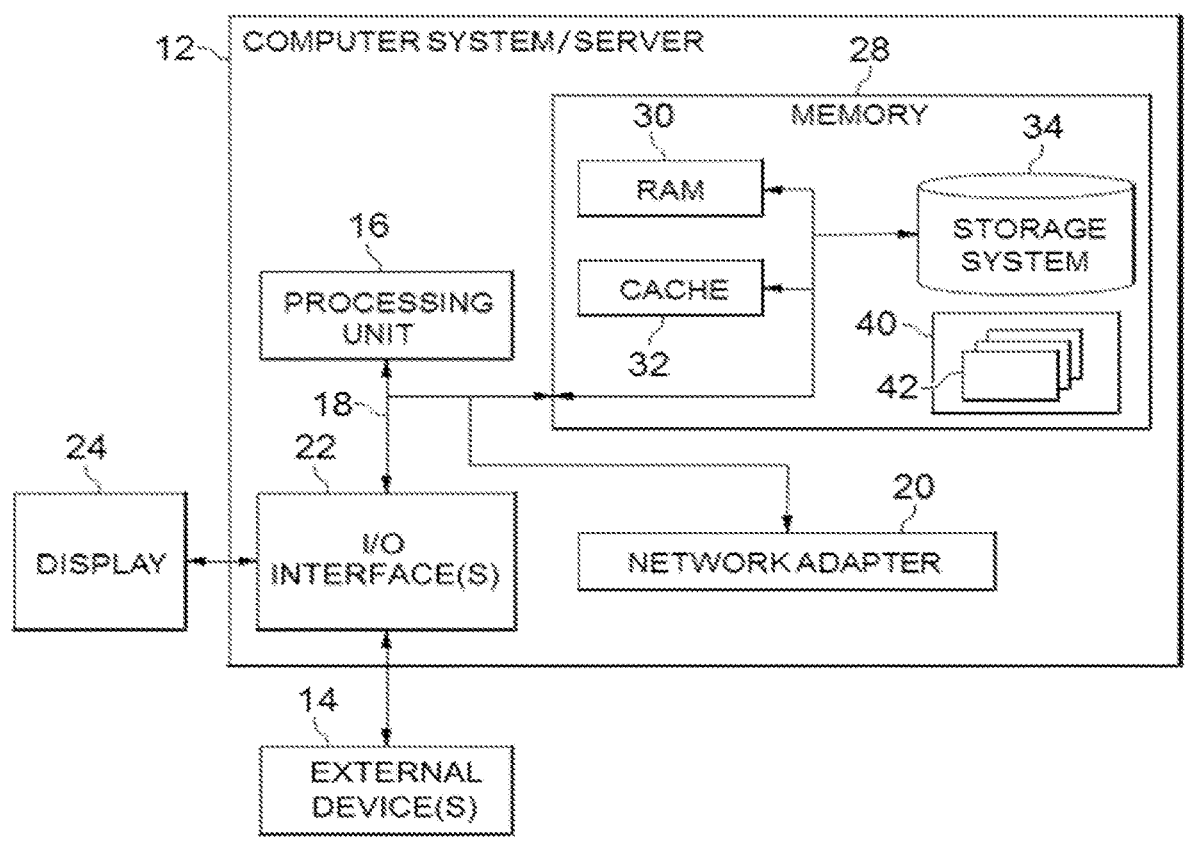
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, except for limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform tasks or implement abstract data types. Computer system/server 12 may be practiced in distributed cloud computing environments where tasks are performed by remote processing devices that are linked through a communications network. In a distributed cloud computing environment, program modules may be in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
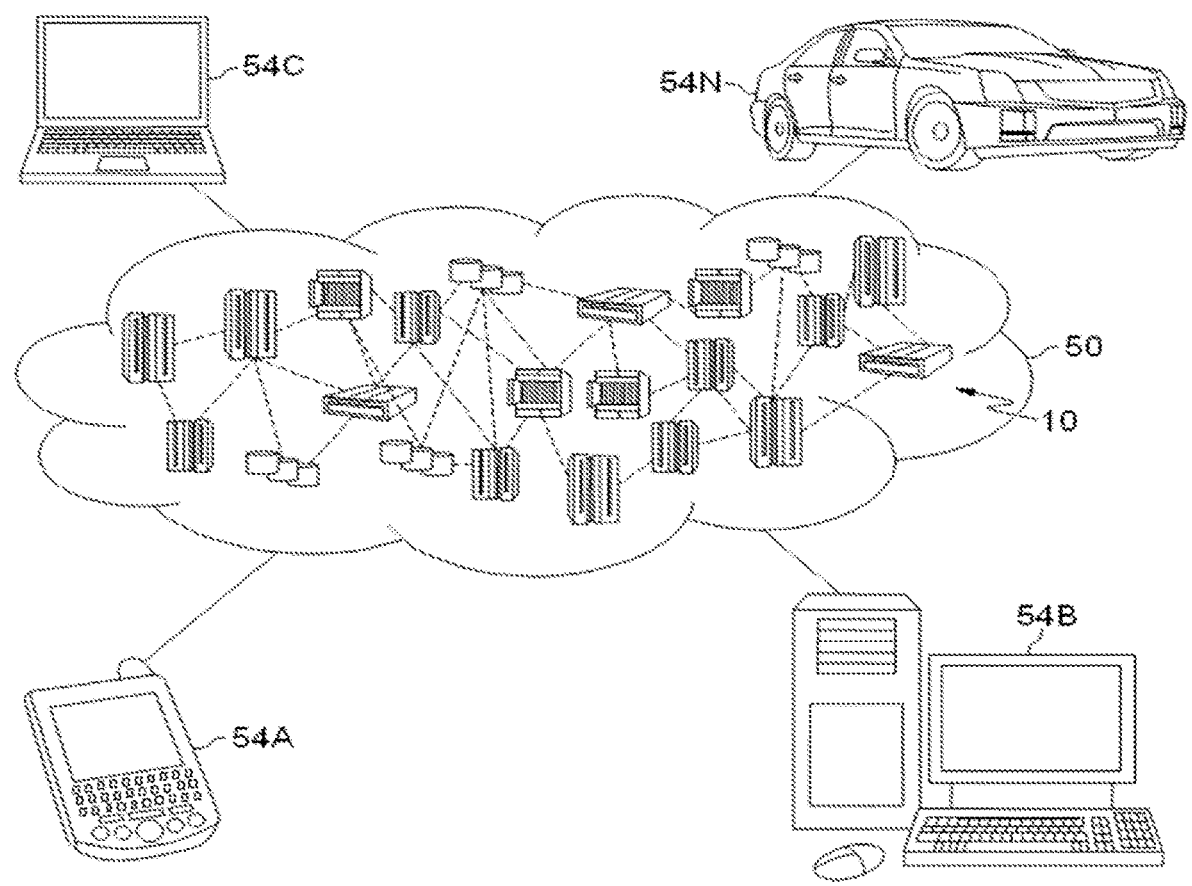
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
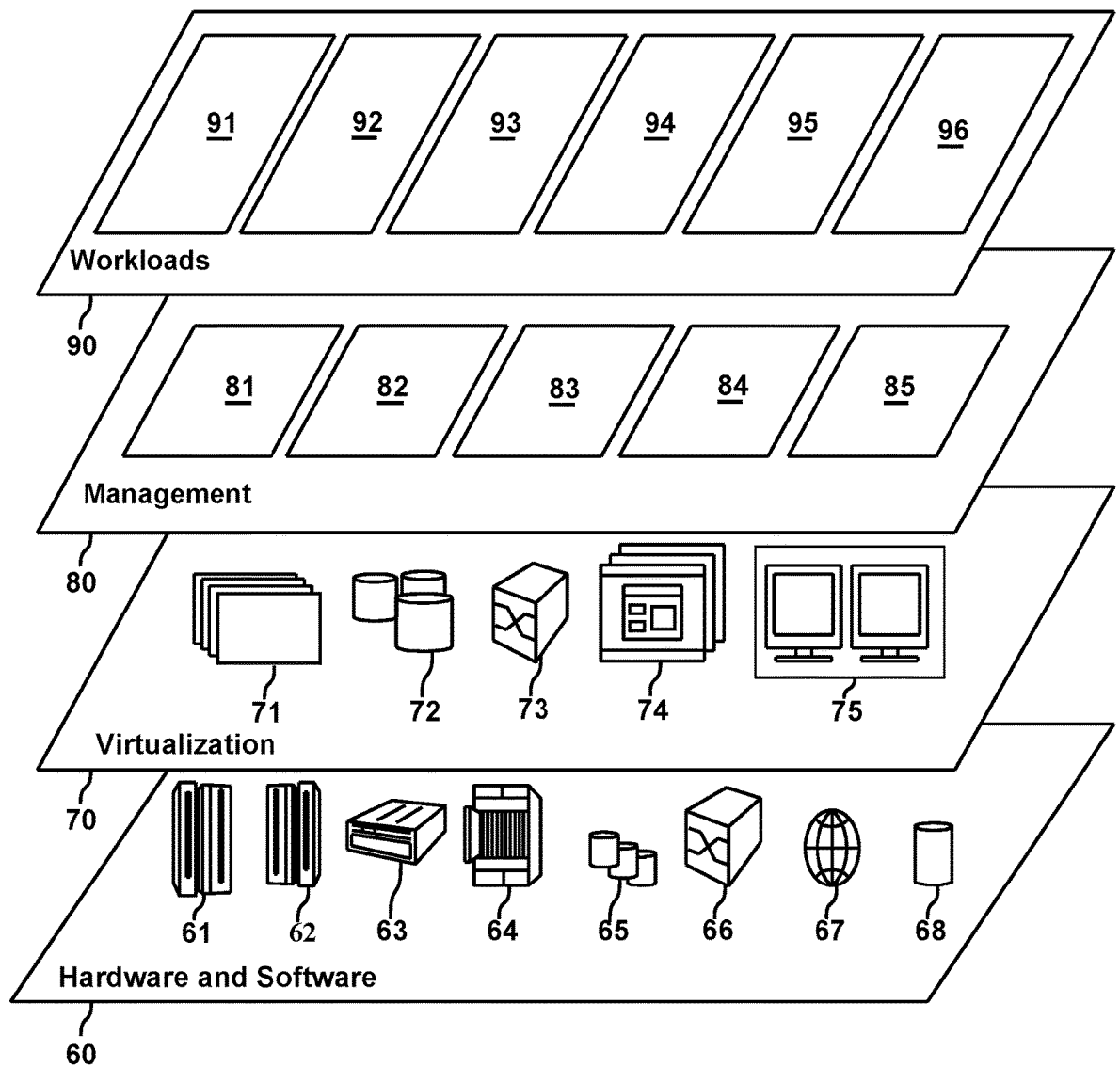
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and search privacy protection 96. The functionalities of search privacy protection 96 will be described in the following embodiment of the present disclosure.

In considering privacy protection in the searching service, although there are laws and regulations such as General Data Protection Regulation (GRPR) in the European Union to forbid the collection of user data, it cannot protect the exploring of hidden user privacy (such as user habits, user preference and so on) from data mining and analysis. Some search systems may utilize advanced analysis algorithms to find the real user intentions. Efficient schemes to protect the user search privacy in a search process has been rarely implemented.

According to embodiments of the present disclosure, there is proposed a solution for search privacy protection. In this solution, a search interaction performed by a user can be analyzed to extract a target emotion vector. Among a plurality of text clusters from a dictionary of text elements, a number of text clusters having relatively larger emotion distances from the target emotion vector are selected and used to construct a plurality of confused search interactions for the search interaction. In some embodiments, the selected text clusters also have relatively larger textual distances from a text vector in the search interaction. The plurality of confused search interactions is performed, for example, in the background of a device which performs the actual search interactions of the user.

Through this solution, by constructing and performing confused search interactions with different emotions from the actual search interactions, it is possible to confuse the algorithm which collects search interactions from user devices and thus hidden actual user attitudes and preferences. In this way, the search privacy can be protected effectively.

Details of the example embodiments will be described in below with reference to the accompanying drawings.

Figure 4:
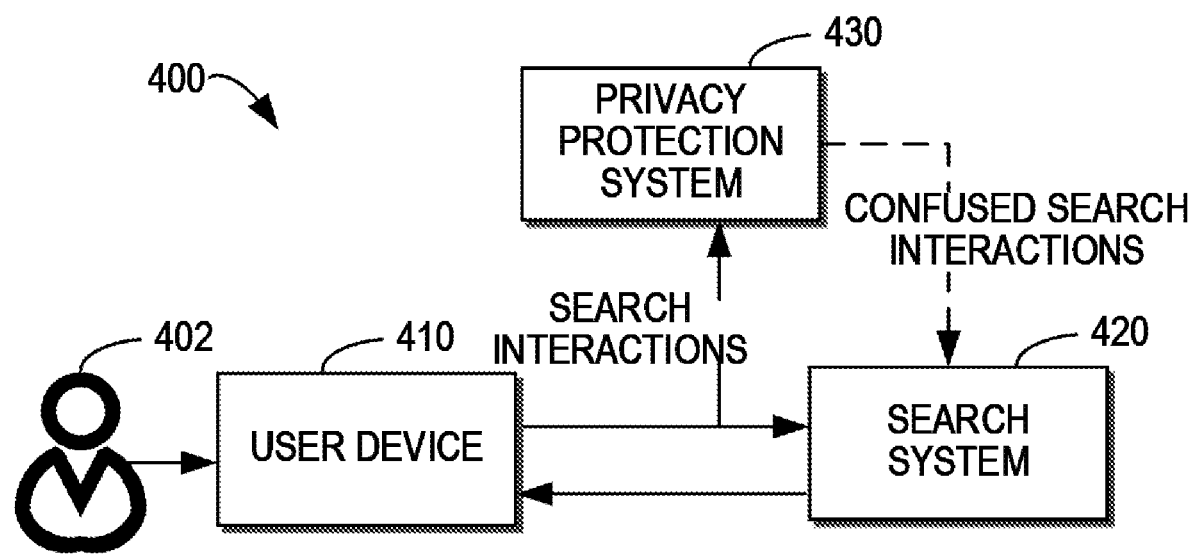
FIG. 4 depicts a block diagram of an example environment in which the embodiments of the present disclosure can be implemented.

FIG. 4 depicts a block diagram of an example environment 400 in which the embodiments of the present disclosure can be implemented. A user 402 may operate a user device 410 to perform search interactions with a search system 420. For example, the user device 410 may receive a search query from the user 402 and send the search query to the search system 420. The search system 420 may respond the search query with a set of search results such as webpages with access links to websites. The search system 420 may be implemented by a search engine or provided by a search provider.

The search results may be presented to the user 402 via an output device (e.g., a display) of the user device 410. The user 402 may browse the search results and select one of the search results, for example, by clicking an access link of the search result, which may lead the user to access other webpages.

In accordance with embodiments of the present disclosure, to protect user privacy during the search process, a privacy protection system 430 is provided. The privacy protection system 430 is configured to generate a plurality of confused search interactions for a search interaction performed by the user 402.

Although illustrated as separated from the user device 410, in some embodiments, the privacy protection system 430 may be implemented in the user device 410. In some other embodiments, the privacy protection system 430 may be implemented separately from the user device 410, for example, as a third-party online service between the user device 410 and the search system 420.

The privacy protection system 430 may include one or more computers/computer systems or servers to perform the functionalities described herein. In some embodiments, the privacy protection system 430 may be implemented in a cloud environment.

Figure 5:
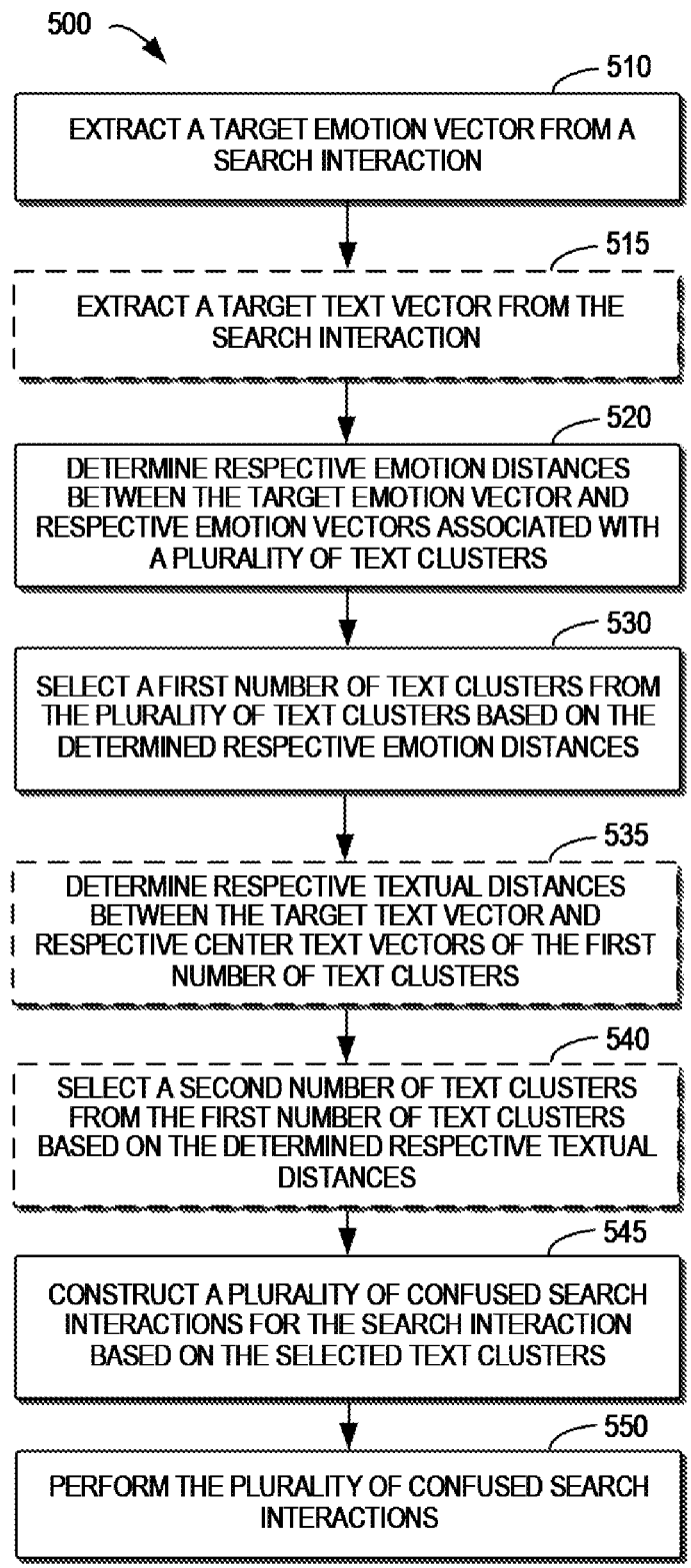
FIG. 5 depicts a flowchart of an example method according to some embodiments of the present disclosure.

The embodiments related to privacy protection in the privacy protection system 430 will be described in detail below with reference to FIG. 5, which illustrates a flowchart of an example method 500 according to some embodiments of the present disclosure. The method 500 can be implemented at the privacy protection system 430 as shown in FIG. 4. For discussion, the method 500 will be described from the perspective of the privacy protection system 430.

At block 510, the privacy protection system 430 extracts a target emotion vector from a search interaction. The target emotion vector represents emotional information in the search interaction.

The privacy protection system 430 is allowed to record search interactions that are performed by the user 402 via the user device 420 during a search process. As used herein, a "search interaction" refers to an action or activity performed during a search process. A search interaction may include a search query input to user device 410 by the user 402, sending the search query input from the user device 410 to the privacy protection system 430, extracting a target emotion vector from the search query input at the privacy protection system 430, selecting text clusters associated with the target emotion vector at the privacy protection system 430, constructing confused search query input with the privacy protection system 430, sending the confused search query input to the search system 420, and performing a search using the confused search query input at the search system 420.

The privacy protection system 430 may determine emotional information in the search interaction and represents the emotional information as a target emotion vector. The emotional information may indicate an emotion with respect to one or more entities present text of in the search interaction. Entities are used to identify people, cities, organizations, and other objects in the search interaction. An entity may be recognized from text of the search interaction by applying Natural Language Processing (NLP) algorithms.

As used herein, a "vector" is a multi-dimensional representation, including a plurality of dimensions which have different values to represent different information. The target emotion vector may include a plurality of emotional dimensions each corresponding to one of a plurality of predefined emotions. As an example, there may be five emotional dimensions corresponding to "happy," "sad," "angry," "like," and "depressed." Each of the five emotional dimensions may have a value from a range of 0 to 1 to indicate a confidence of the corresponding emotion being presented. In some embodiments, the privacy protection system 430 may determine an emotion vector for each of one or more recognized entities. In the case of more than one entity being recognized, the privacy protection system 430 may determine the target emotion vector based on the emotion vectors of all the recognized entities, for example, by determining an average of the emotion vectors of all the recognized entities.

In some embodiments, in addition to the emotional information, textual information in the search interaction may also be used in constructing confused search interactions. As illustrated in FIG. 5, at block 515, as an option, the privacy protection system 430 extracts a target text vector from the search interaction. The target text vector represents textual information in the search interaction.

In some embodiments, the privacy protection system 430 may extract one or more entities present in text of the search interaction and determine the target text vector based on the target text vector. The text of the search interaction may include, for example, a search query, or text of a search result selected by the user. In some embodiments, the privacy protection system 430 may convert one or more recognized entities into one or more text vectors. Each text vector may uniquely identify the corresponding entity. The privacy protection system 430 may determine the target text vector from the one or more text vectors.

In some embodiments, the privacy protection system 430 may determine the target emotion vector and the text vector for each search interaction during a search process of the user. For example, the privacy protection system 430 may extract the entities and the emotion vectors from a series of search interactions as follows:

TABLE 1

| Search interactions | Entities | Confidence | Emotion vectors |
|---|---|---|---|
| 1 | IBM ®, Watson | [0.98, 0.73] | [[0.137518, . . . , 0.107001], [0.148459, . . . , 0.054258]] |
| 2 | IBM ® Cloud Pak, Amazon ® Web Services, Microsoft ® Azure | [0.76, 0.91, 0.58] | [[0.239082, . . . , 0.343425], [0.886431, . . . , 0.098164], [0.664521, . . . , 0.098741]] |
| . . . | . . . | . . . | . . . |

In Table 1, the column of "Confidence" includes confidences of corresponding entities recognized from the search interaction, the column of "Emotion vectors" includes emotion vectors indicating emotions with respect to the corresponding entities. In the example of Table 1, in each search interactions, there is more than one entity, and thus more than one emotion vectors are determined.

Based on Table 1, the privacy protection system 430 may convert the recognized entities in a search interaction into one or more text vectors. The privacy protection system 430 may utilize an NLP model such as Word2Vec to convert the entities in a search interaction as text vectors. Further, the privacy protection system 430 may determine the target text vector by weighting the text vectors and summing the weighted text vectors. The text vectors may be weighted with weights that are determined from the confidences of the entities, such as 0.98 and 0.73 for the entities "IBM®" and "Watson". The target text vector determined in this way may also be referred to as a center text vector or center point vector (CPV), which can represent all the entities in the search interaction.

Based on Table 1, the privacy protection system 430 may further determine the target emotion vector for each search interaction. The privacy protection system 430 may average the emotion vectors of all the recognized entities in the search interaction, to obtain the target emotion vector. The target text vectors and target emotion vectors (represented as "CPV") for the search interactions in Table 1 may be determined as below:

TABLE 2

| Search interactions | Target text vectors | Target emotion vectors |
|---|---|---|
| 1 | CPV1 | [0.207089, . . . , 0.074713] |
| 2 | CPV2 | [0.886431, . . . , 0.098164] |
| . . . | . . . | . . . |

It would be appreciated that the examples and values in Table 1 and Table 2 are provided for the purpose of illustration only without suggesting any limitation.

At block 520, the privacy protection system 430 determines respective emotion distances between the target emotion vector and respective emotion vectors associated with a plurality of text clusters.

The plurality of text clusters may each include text elements from a dictionary of text elements. The dictionary of text elements is used as a source for constructing confused (or backend) search interactions. The dictionary may include text elements in any natural languages. A text element may be a word, a phrase, or the like which have meaning in certain natural languages. In some embodiments, the dictionary of text elements may include text elements which are used the NLP model for generating the text vectors.

By clustering text elements, a plurality of text clusters may be obtained. Any suitable clustering algorithms/techniques may be applied to perform the clustering of the dictionary. Each of the text clusters may include several text elements. The text elements within a same text cluster may be like each other. For example, text elements may be clustered by similar or same meaning, or the like. In some embodiments, the number of the text clusters (e.g., K) may be determined as a relatively large value because it may need enough clusters to construct distinguishing confused search interactions.

The confused search interactions are performed to confuse any potential monitoring systems which collect search interactions of the user to analyze user preferences for the purpose of recommendation or monitoring. In embodiments of the present disclosure, it is expected to construct the confused search interactions which have different emotions from the search interactions performed by the user to hidden user privacy. In this sense, the privacy protection system 430 may measure the emotion distances between the target emotion vector and emotion vectors associated with the plurality of text clusters.

Each of the plurality of text clusters is associated with an emotion vector, which indicates an overall emotion of a user with respect to the text elements in the text cluster. The determination of the emotion vector associated with each text cluster is described below.

An emotion distance between the target emotion vector in a search interaction and an emotion vector of one of the plurality of text clusters may indicate a difference between the search interaction and the text cluster. If the emotion distance is relatively large, it means that a user has different emotions with respect to the entities involved in the search interaction and with respect to the entities involved in the text cluster. In some embodiments, the emotion distance may be measured as Euclidean distance between the two emotion vectors.

At block 530, the privacy protection system 430 selects a first number of text clusters from the plurality of text clusters based on the determined respective emotion distances. The first number of text clusters all have emotion distances larger than at least one unselected text cluster among the plurality of text clusters. In some embodiments, the first number is a predetermined number (e.g., M) and then the first number of text clusters have the highest emotion distances may be selected. In some embodiments, the first number of text clusters having emotion distances larger than a predetermined threshold may be selected.

A plurality of confused search interactions may be determined from text elements in the first number of text clusters. In some embodiments, in addition to the target emotion vector and the emotion distances, the target text vector of the search interaction may also be considered when constructing the confused search interactions. In this case, at block 535, as an option, the privacy protection system 430 determines respective textual distances between the target text vector and respective center text vectors of the first number of text clusters.

Each of the plurality of text clusters is associated with a center text vector. For each text cluster, the center text vector may be determined based on text vectors of all the text elements in the text cluster. For example, the center text vector may be determined as an average of the text vectors of all the text elements in the text cluster. A textual distance between the target text vector in a search interaction and a center text vector of a text cluster may indicate a difference between the search interaction and the text cluster in the aspect of text. If the textual distance is relatively large, the entities involved in the search interaction are different from the entities involved in the text cluster, which means that the textual information are also different. In some embodiments, the textual distance may be measured as Euclidean distance between the two text vectors. Some further embodiments related to the determination of the textual distance will be described in the following.

At block 540, the privacy protection system 430 selects a second number of text clusters from the first number of text clusters based on the determined respective textual distances. The second number of text clusters all have text distances larger than at least one unselected text cluster among the first number of text clusters. Therefore, the second number of text clusters may have both different emotional information and different textual information from text of the search interaction.

In some embodiments, the second number is a predetermined number (e.g., N) and then the second number of text clusters have the highest textual distances may be selected. In some embodiments, the second number of text clusters having textual distances larger than a predetermined threshold may be selected.

At block 545, the privacy protection system 430 constructs a plurality of confused search interactions for the search interaction based on the selected text clusters. In constructing the confused search interactions, each confused search interaction may comprise at least one text element comprised at least one of the selected text clusters. In some embodiments, the number of the confused search interactions constructed for each search interaction may be predetermined or may be a random value. In some embodiments, in constructing a confused search interaction, one or more text elements may be randomly selected from a certain text cluster.

It would be appreciated that in the embodiments where the target text vector and the textual distances are not considered, the confused search interactions may be constructed from the second number of selected text clusters.

At block 550, the privacy protection system 430 performs the plurality of confused search interactions. For example, the privacy protection system 430 may interact with the search system 420 to perform the confused search interactions. In some embodiments, execution of the confused search interactions may be performed in background or remotely so that the user may not be aware of it.

In some embodiments, the execution of the confused search interactions may be the same as the actual execution of the search interaction by the user. For example, in some embodiments, if the search interaction is a search query, the privacy protection system 430 may perform the plurality of confused search interactions as a plurality of confused search queries, for example, by sending the text elements in each confused search interaction as a search query to the search system 420.

In some embodiments, if the search interaction is a user selection of one of a set of search results, the privacy protection system 430 may determine, from the set of search results, a plurality of search results based on respective similarities between the plurality of confused search interactions and the set of search result. The privacy protection system 430 may select the search results that are like the confused search interactions, such as the search results comprising the same or similar text elements in the confused search interactions. Then the privacy protection system 430 may perform selections of the plurality of search results, for example, by clicking access links comprising the same or similar text elements in the confused search interactions. In this way, simulated access to the corresponding webpages or websites may be performed although the user may not actually click the access links.

In some embodiments, in addition to determine the confused search interactions for a current search interaction, the privacy protection system 430 may determine a predicted search interaction following the current search interaction and determine a plurality of further confused search interactions for the predicted search interaction. The determination of the confused search interactions for the predicted search interaction is similar as the determination of the confused search interactions as discussed above. In this way, it is possible to proactively protect the user privacy in potential search.

In some embodiments, the privacy protection system 430 may predict the search interaction following the current search interaction based on the current search interaction and one or more previous search interactions. Those search interactions that are performed by the user may indicate a search pattern of the user, so the privacy protection system 430 may be able to predict a next action of the user. In some embodiments, the privacy protection system 430 may apply an association rule to predict the following search interaction. In some embodiments, the privacy protection system 430 may determine more than one predicted search interaction following the current search interaction and determine confused search interactions for each of the predicted search interactions.

As mentioned above, each text cluster is associated with an emotion vector, to indicate an overall emotion of a user with respect to the text elements in this text cluster. In some embodiments, each text cluster may also be associated with a searching frequency which indicates how often a text element(s) in this text cluster is searched by the user. The emotion vector and the searching frequency associated with the text cluster may be updated over time as the user performs a series of search interactions.

The determination and update of the emotion vector and the searching frequency associated with one text cluster will be described below. The process may be repeated for each of the plurality of text clusters.

In some embodiments, an initial emotion vector for a text cluster may be set as a default zero-vector (with all emotional dimensions set as zero) or may be determined from a corpus such as from webpages from Internet. In some embodiments, a searching frequency for a text cluster may be valued in a range from 0 to 1, with the higher value indicating a higher frequency. An initial searching frequency for a text cluster may be set as zero.

To determine the emotion distances for each search interaction (i.e., the current search interaction), the privacy protection system 430 may determine the emotion vectors for the plurality of text clusters. For each of the plurality of text clusters, to determine the privacy protection system 430 may determine the associated emotion vector based on a determination of whether this text cluster comprises a text element included in the current search interaction and at least one emotion vector determined for this text cluster in at least one previous search interaction.

In some embodiments, if the text cluster comprises a text element included in the search interaction, the privacy protection system 430 may determine the target emotion vector extracted for this search interaction as a base emotion vector for the text cluster. If the text cluster comprises no text element included in the search interaction, which means that this text cluster is not searched, then the privacy protection system 430 may determine the base emotion vector for the text cluster as a zero vector.

For each of the previous search interactions, the privacy protection system 430 may record the associated emotion vector determined for each of the plurality of text clusters. The privacy protection system 430 may combine the associated emotion vector(s) determined for one or more previous search interactions and the base emotion vectors determined for the current search interaction, to generate the emotion vector associated with the text cluster in the current search interaction. In some embodiments, the privacy protection system 430 may have a monitor window, to record recent L search interactions (including the current search interaction and (L-1) previous search interactions. The L search interactions may be referred to as reference search interactions for determining the associated emotion vector and for determining the associated searching frequency (as described below) for the current search interaction.

When combining the associated emotion vector(s) determined for one or more previous search interactions, the privacy protection system 430 may assign corresponding weights to those vectors. The weights may be determined based on the relative temporal distance from the at least one previous search interaction to the current search interaction. The base emotion vector may also be assigned with a weight. In some embodiments, if the relative temporal distance from a previous search interaction to the current search interaction is relatively larger, the weight may be set as a relatively small value, which indicates that the associated emotion vector determined for this old search interaction has a small impact on the emotion vector in the current search interaction.

The privacy protection system 430 may determine an emotion vector associated with the text cluster by weighting the base emotion vector and the at least one emotion vector associated with the at least one previous search interaction with the corresponding weights and calculating a sum of the weighted base emotion vector and the weighted at least one emotion vector. In some examples, the emotion vector associated with a text cluster in a search interaction may be determined as follows:

$$VE(t) = \sum_{x=0}^{L-1} \frac{2(L-x)}{L(L+1)} VE(t-x) \quad (1)$$

where VE(t) in the left side of Equation (1) represents an emotion vector associated with a certain text cluster in the current (latest) search interaction, L represents the number of search interactions recorded, VE(t–x) represents an emotion vector associated with the same text cluster in a previous search interaction when x is larger than 1.

In the right side of Equation (1), when x=0, VE(t–x) represents a base emotion vector for the text cluster in the current search interaction, which may be determined based on whether this text cluster comprises a text element included in the current search interaction. The factor $$\text{``} \frac{2(L-x)}{L(L+1)} \text{''}$$

is a weight for the base emotion vector or the emotion vector associated with the same text cluster in a previous search interaction. It is understood that with x increased, the weight becomes smaller and then the corresponding emotion vector has less impact on the resulting emotion vector in the latest search interaction.

In some embodiments, for each of the plurality of text clusters, to determine the privacy protection system 430 may determine the associated searching frequency based on a determination of whether a text element in the text cluster is comprised in the current search interaction and one or more previous search interactions and may further based on respective relative temporal distances from respective those search interactions to the current search interaction. The current search interaction and one or more previous search interactions considered in determining the searching frequency may sometimes be referred to as reference search interactions.

In some embodiments, the privacy protection system 430 may determine whether a text element in a text cluster is comprised in any one of the current search interactions and the one or more previous search interactions. If the text element in the text cluster is comprised in one of the current search interactions and the one or more previous search interactions, the privacy protection system 430 may determine a base frequency for the search interaction as a first value. Otherwise, if none of the text elements in the text cluster is comprised in the search interaction, the privacy protection system 430 may determine a base frequency for the search interaction as a second value. The second value is smaller than the first value. In some embodiments, the privacy protection system 430 may determine a base frequency for the search interaction as "1" if this search interaction involves any text element in the text cluster and may determine the base frequency for the search interaction as "0" if this search interaction involves none of the text elements in the text cluster.

The privacy protection system 430 may assign respective weights for the current search interactions and the one or more previous search interactions based on the respective relative temporal distances from those reference search interactions to the current search interaction. In some embodiments, if the relative temporal distance from a previous search interaction to the current search interaction is relatively larger, the weight may be set as a relatively small value, which indicates that the associated base frequency determined for this old search interaction has a small impact on the searching frequency in the current search interaction. The privacy protection system 430 may determine the corresponding searching frequency for the text cluster by weighting the base frequencies for the current search interactions and the one or more previous search interactions with the assigned weights, and then calculating a sum of the weighted base frequencies. In some examples, the searching frequency associated with a text cluster in a search interaction may be determined as follows:

$$F(t) = \sum_{x=0}^{L-1} \frac{2(L-x)}{L(L+1)} FF(t-x) * \text{revised} \quad (2)$$

where F(t) in the left side of Equation (2) represents searching frequency associated with a certain text cluster in the current (latest) search interaction, L represents the number of search interactions recorded, FF(t–x) represents a base frequency associated with the same text cluster in a previous search interaction when x is larger than 1 or in a current search interaction when x is 0. The factor $$\text{``} \frac{2(L-x)}{L(L+1)} \text{''}$$

is a weight for the base frequency associated with the same text cluster in a previous/current search interaction. It is understood that with x increased, the weight becomes smaller and then the corresponding emotion vector has less impact on the resulting emotion vector in the latest search interaction.

In Equation (2), the factor "revised" is used to adjust the search frequency to meet a protection policy. The factor "revised" may be initially set to a value of 1. The adjusting of the factor "revised" will be described below.

It is understood that the emotion vectors and the searching frequencies may be updated in each search interactions for the plurality of text clusters. In a current search interaction, the associated emotion vectors, searching frequencies and text vectors of the plurality of text clusters (a total of K text clusters) may be listed as Table 3.

TABLE 3

| Text Cluster | Text vectors | Searching frequency | Emotion vectors |
| --- | --- | --- | --- |
| 1 | CPV1 | 0.4 | [0.137518, 0.148459, 0.132986, 0.054258, 0.107001] |
| 2 | CPV2 | 0.76 | [0.137518, 0.148459, 0.132986, 0.054258, 0.107001] |
| ... | ... | ... | ... |
| K | CPVK | 0.5 | [0.207089, 0.332641, 0.087456, 0.125259, 0.074713] |

In Table 3, the values in the columns of "Searching frequencies" and "Emotion vectors" may be updated for each search interaction performed by the user.

In some embodiments, as mentioned above, the privacy protection system 430 determines respective textual distances between the target text vector and respective center text vectors of the first number of text clusters (which are selected based on the emotion distances). In some embodiments, the privacy protection system 430 may determine the respective textual distances as respective Euclidean distances between the target text vector and respective center text vectors of the first number of text clusters and weight the respective textual distances based on the determined corresponding searching frequencies in the first number of text clusters. In this way, a text cluster with a higher searching frequency may be determined as having a larger textual distance from the target text vector of the current search interaction.

In some embodiments, after executing the confused search interactions, the privacy protection system 430 may monitor the recommendation items provided to the user, to indicate whether the search system 420 or other systems may still be able to extract information related to the actual search interactions performed by the user (e.g., the user preferences, the user attitudes, and the like).

In some embodiments, the privacy protection system 430 may determine a confusion rate based on the number of performed search interactions and a total number of performed search interactions and performed confused search interactions. The confusion rate may be determined as a ratio of the number of performed search interactions to the total number, which may be represented as follows:

$$\text{Confusion rate} = \frac{\text{Number of performed search interactions}}{\text{Number of performed search interactions} + \text{number of confused search interactions}} \quad (3)$$

The privacy protection system 430 may further determine a relevancy rate based on the number of recommendation items that are related to the performed search interactions and a total number of recommendation items. The recommendation items may include advertisements and/or other reference contents. In some embodiments, the relevancy rate may be determined as a ratio of the number of related recommendation items to the total number of recommendation items, which may be represented as follows:

$$\text{Relevancy rate} = \frac{\text{Number of related recommendation items}}{\text{total number of recommendation items}} \quad (4)$$

If most of the recommendation items are found to be related to the actual search interactions performed by the user, it means that the confused search interactions cannot successfully confuse the recommendation algorithm, and then confused search interactions that have larger distances from the actual search interactions need to be constructed. In some embodiments, the privacy protection system 430 may determine the relevancy rate is larger than the confusion rate. If the relevancy rate is larger than the confusion rate, the privacy protection system 430 may increase the searching frequencies associated with the plurality of text clusters. For example, the privacy protection system 430 may increase the factor "revised" in Equation (2), e.g., increase it to be larger than one, to make the resulting searching frequencies calculated as larger values. With the searching frequencies increased, the textual distances determined for the plurality of text clusters are increased and then the privacy protection system 430 may be able to construct the confused search interactions from text clusters with larger distances from the current search interaction.

In some embodiments, the calculation of the confusion rate and the relevancy rate may be determined after a period, and the factor "revised" may be adjusted for use in the following period.

It should be noted that the processing of search privacy protection according to the embodiments of this disclosure could be implemented by computer system/server 12 of FIG. 1. In some embodiments, the privacy protection system 430 could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    extracting, by one or more processors, a target emotion vector from a search interaction, the target emotion vector representing emotional information in the search interaction;
    determining, by one or more processors, respective emotion distances between the target emotion vector and respective emotion vectors associated with a plurality of text clusters, the plurality of text clusters each comprising text elements from a dictionary of text elements;
    selecting, by one or more processors, a first number of text clusters from the plurality of text clusters based on the determined respective emotion distances, the respective emotion distances indicating a degree of difference of the target emotion vector to the respective emotion vectors, the first number of text clusters having emotion distances larger than at least one unselected text cluster among the plurality of text clusters;

constructing, by one or more processors, a plurality of confused search interactions for the search interaction based on the first number of text clusters; and performing, by one or more processors, the plurality of confused search interactions.

2. The method of claim 1, wherein constructing the plurality of confused search interactions comprises:

extracting, by one or more processors, a target text vector from the search interaction, the target text vector representing textual information in the search interaction;

determining, by one or more processors, respective textual distances between the target text vector and respective center text vectors of the first number of text clusters;

selecting, by one or more processors, a second number of text clusters from the first number of text clusters based on the determined respective textual distances, the second number of text clusters having text distances larger than at least one unselected text cluster among the first number of text clusters; and constructing, by one or more processors, the plurality of confused search interactions from the second number of text clusters.

3. The method of claim 2, wherein each of the plurality of confused search interactions comprises at least one text element comprised at least one of the second number of text clusters.

4. The method of claim 2, wherein selecting a second number of text clusters from the first number of text clusters based on the determined respective textual distances comprises:

for each of the first number of text clusters, determining, by one or more processors, a corresponding searching frequency for the text cluster based on:
 a determination of whether a text element in the text cluster is comprised in a plurality of reference search interactions, the plurality of reference search interactions comprising the search interaction and at least one previous search interaction, and
 respective relative temporal distances from respective ones of the plurality of reference search interactions to the search interaction;

weighting, by one or more processors, the respective textual distances based on the determined corresponding searching frequencies in the first number of text clusters; and selecting, by one or more processors, the second number of text clusters from the first number of text clusters based on the respective weighted textual distances.

5. The method of claim 4, wherein determining a corresponding searching frequency for the text cluster comprises:

for each of the plurality of reference search interactions,
 in accordance with a determination that a text element in the text cluster is comprised in the reference search interaction, determining, by one or more processors, a base frequency for the reference search interaction as a first value,
 in accordance with a determination that the reference search interaction comprises no text element in the text cluster, assigning, by one or more processors, the base frequency for the reference search interaction as a second value, the second value being smaller than the first value;

assigning, by one or more processors, respective weights for the plurality of reference search interactions based on the respective relative temporal distances from the plurality of reference search interactions to the search interaction;

weighting, by one or more processors, the base frequencies for the plurality of reference search interactions with the assigned weights; and determining, by one or more processors, the corresponding searching frequency for the text cluster based on a sum of the weighted base frequencies.

6. The method of claim 4, further comprising:

determining, by one or more processors, a confusion rate based on the number of performed search interactions and a total number of performed search interactions and performed confused search interactions;

determining, by one or more processors, a relevancy rate based on the number of recommendation items related to the performed search interactions and a total number of recommendation items; and in accordance with a determination that the relevancy rate is larger than the confusion rate, increasing, by one or more processors, the searching frequencies, and wherein weighting the respective textual distances comprises: weighting, by one or more processors, the respective textual distances with the increased searching frequencies.

7. The method of claim 1, further comprising: for a given text cluster of the plurality of text clusters, in accordance with a determination that the given text cluster comprises a text element included in the search interaction, determining, by one or more processors, the target emotion vector as a base emotion vector for the given text cluster;

assigning, by one or more processors, a weight to the base emotion vector for the given text cluster;

assigning, by one or more processors, at least one further weight to at least one emotion vector determined for the given text cluster in at least one previous search interaction based on at least one relative temporal distance from the at least one previous search interaction to the search interaction; and weighting, by one or more processors, the base emotion vector and the at least one emotion vector associated with at least one previous search interaction with the corresponding weights;

determining, by one or more processors, an emotion vector associated with the given text cluster based on a sum of the weighted base emotion vector and the weighted at least one emotion vector.

8. The method of claim 1, wherein performing the plurality of confused search interactions comprises:

in accordance with a determination that the search interaction is a search query, performing, by one or more processors, the plurality of confused search interactions as a plurality of confused search queries; and in accordance with a determination that the search interaction is a user selection of one of a set of search results,
 determining, by one or more processors and from the set of search results, a plurality of search results based on respective similarities between the plurality of confused search interactions and the set of search results, and
 performing selections of the plurality of search results.

9. The method of claim 1, further comprising:

determining, by one or more processors, a predicted search interaction following the search interaction; and determining, by one or more processors, a plurality of further confused search interactions for the predicted search interaction.

10. A system comprising:
one or more processing units; and
a memory coupled to the one or more processing units and storing instructions thereon, the instructions, when executed by the one or more processing units, performing operations comprising:
  extracting a target emotion vector from a search interaction, the target emotion vector representing emotional information in the search interaction;
  determining respective emotion distances between the target emotion vector and respective emotion vectors associated with a plurality of text clusters, the plurality of text clusters being clustered from a dictionary of text elements;
  selecting a first number of text clusters from the plurality of text clusters based on the determined respective emotion distances, the respective emotion distances indicating a degree of difference of the target emotion vector to the respective emotion vectors, the first number of text clusters having emotion distances larger than at least one unselected text cluster among the plurality of text clusters;
  constructing a plurality of confused search interactions for the search interaction based on the first number of text clusters; and
  performing the plurality of confused search interactions.

11. The system of claim 10, wherein constructing the plurality of confused search interactions comprises:
  extracting a target text vector from the search interaction, the target text vector representing textual information in the search interaction;
  determining respective textual distances between the target text vector and respective center text vectors of the first number of text clusters;
  selecting a second number of text clusters from the first number of text clusters based on the determined respective textual distances, the second number of text clusters having text distances larger than at least one unselected text cluster among the first number of text clusters; and
  constructing the plurality of confused search interactions from the second number of text clusters.

12. The system of claim 11, wherein each of the plurality of confused search interactions comprises at least one text element comprised at least one of the second number of text clusters.

13. The system of claim 11, wherein selecting a second number of text clusters from the first number of text clusters based on the determined respective textual distances comprises:
  for each of the first number of text clusters, determining a corresponding searching frequency for the text cluster based on:
    a determination of whether a text element in the text cluster is comprised in a plurality of reference search interactions, the plurality of reference search interactions comprising the search interaction and at least one previous search interaction, and
    respective relative temporal distances from respective ones of the plurality of reference search interactions to the search interaction;
  weighting the respective textual distances based on the determined corresponding searching frequencies in the first number of text clusters; and
  selecting the second number of text clusters from the first number of text clusters based on the respective weighted textual distances.

14. The system of claim 13, wherein determining a corresponding searching frequency for the text cluster comprises:
  for each of the plurality of reference search interactions,
    in accordance with a determination that a text element in the text cluster is comprised in the reference search interaction, determining a base frequency for the reference search interaction as a first value,
    in accordance with a determination that the reference search interaction comprises no text element in the text cluster, assigning the base frequency for the reference search interaction as a second value, the second value being smaller than the first value;
  assigning respective weights for the plurality of reference search interactions based on the respective relative temporal distances from the plurality of reference search interactions to the search interaction;
  weighting the base frequencies for the plurality of reference search interactions with the assigned weights; and
  determining the corresponding searching frequency for the text cluster based on a sum of the weighted base frequencies.

15. The system of claim 13, further comprising:
  determining a confusion rate based on the number of performed search interactions and a total number of performed search interactions and performed confused search interactions;
  determining a relevancy rate based on the number of recommendation items related to the performed search interactions and a total number of recommendation items; and
  in accordance with a determination that the relevancy rate is larger than the confusion rate, increasing the searching frequencies, and
  wherein weighting the respective textual distances comprises: weighting the respective textual distances with the increased searching frequencies.

16. The system of claim 10, further comprising: for a given text cluster of the plurality of text clusters,
  in accordance with a determination that the given text cluster comprises a text element included in the search interaction, determining the target emotion vector as a base emotion vector for the given text cluster;
  assigning a weight to the base emotion vector for the given text cluster;
  assigning at least one further weight to at least one emotion vector determined for the given text cluster in at least one previous search interaction based on at least one relative temporal distance from the at least one previous search interaction to the search interaction; and
  weighting the base emotion vector and the at least one emotion vector associated with at least one previous search interaction with the corresponding weights;
  determining an emotion vector associated with the given text cluster based on a sum of the weighted base emotion vector and the weighted at least one emotion vector.

17. The system of claim 10, wherein performing the plurality of confused search interactions comprises:

in accordance with a determination that the search interaction is a search query, performing the plurality of confused search interactions as a plurality of confused search queries; and in accordance with a determination that the search interaction is a user selection of one of a set of search results,
- determining, from the set of search results, a plurality of search results based on respective similarities between the plurality of confused search interactions and the set of search results, and
- performing selections of the plurality of search results.

18. The system of claim 10, further comprising:
- determining a predicted search interaction following the search interaction; and
- determining a plurality of further confused search interactions for the predicted search interaction.

19. A computer program product, the computer program product comprising a computer readable storage medium having program instructions embodied therewith, the program instructions executable by an electronic device to cause the electronic device to perform operations comprising:
- extracting a target emotion vector from a search interaction, the target emotion vector representing emotional information in the search interaction;
- determining respective emotion distances between the target emotion vector and respective emotion vectors associated with a plurality of text clusters, the plurality of text clusters being clustered from a dictionary of text elements;
- selecting a first number of text clusters from the plurality of text clusters based on the determined respective emotion distances, the respective emotion distances indicating a degree of difference of the target emotion vector to the respective emotion vectors, the first number of text clusters having emotion distances larger than at least one unselected text cluster among the plurality of text clusters;
- constructing a plurality of confused search interactions for the search interaction based on the first number of text clusters; and
- performing the plurality of confused search interactions.

20. The computer program product of claim 19, wherein constructing the plurality of confused search interactions comprises:
- extracting a target text vector from the search interaction, the target text vector representing textual information in the search interaction;
- determining respective textual distances between the target text vector and respective center text vectors of the first number of text clusters;
- selecting a second number of text clusters from the first number of text clusters based on the determined respective textual distances, the second number of text clusters having text distances larger than at least one unselected text cluster among the first number of text clusters; and
- constructing the plurality of confused search interactions from the second number of text clusters.

* * * * *